Patented Feb. 16, 1954

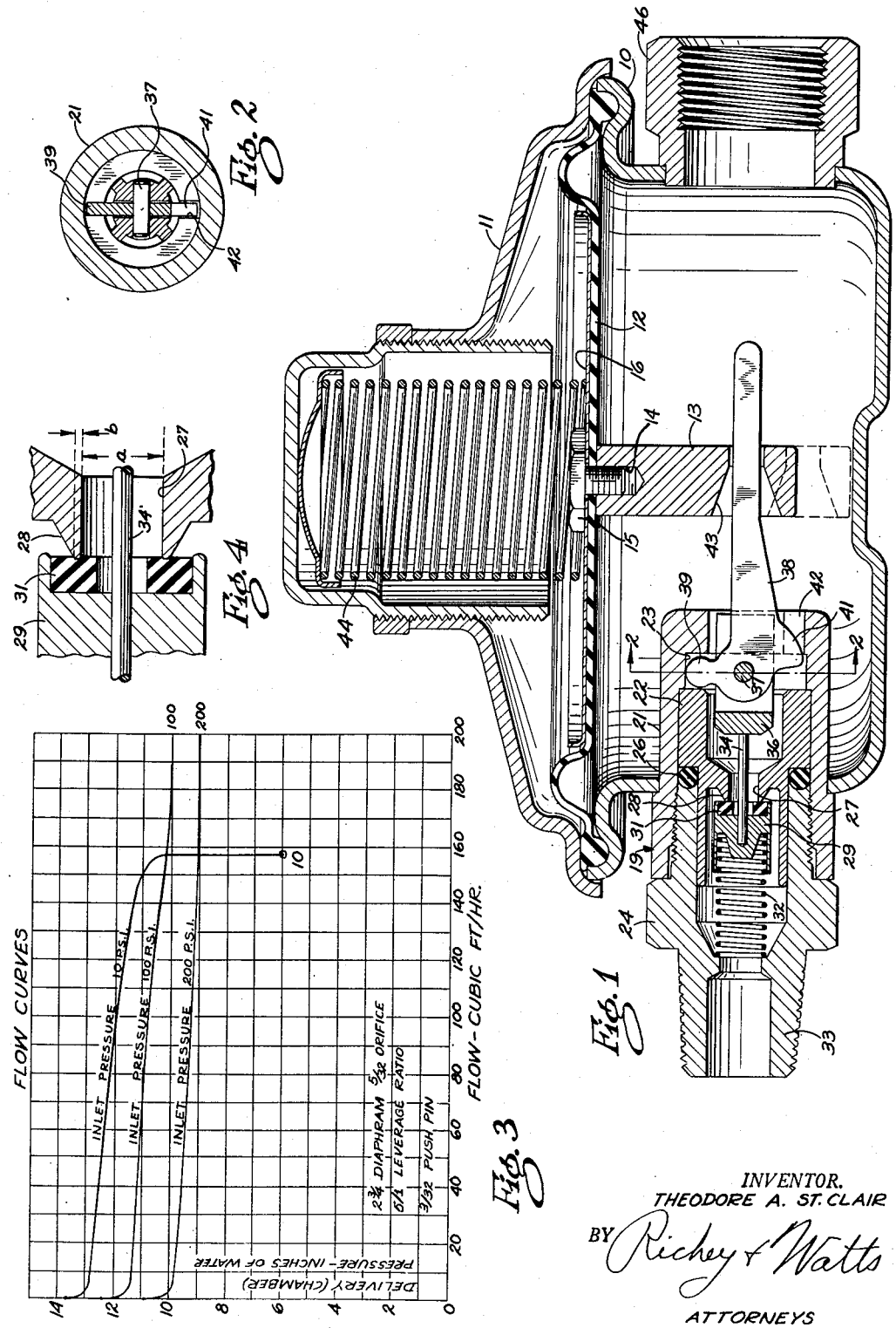

2,669,071

UNITED STATES PATENT OFFICE 2,669,071

FLAT CHARACTERISTIC REGULATOR

Theodore A. St. Clair, Cleveland, Ohio, assignor to The Weatherhead Company, Cleveland, Ohio, a corporation of Ohio Application August 23, 1951, Serial No. 243,225

4 Claims. (Cl. 50—26)

This invention relates to fluid pressure regulators and more particularly to such regulators that are diaphragm-controlled and operate through a multiplying lever system. For example, regulators of the type mentioned are commonly employed in connection with the dispensing of liquified petroleum gas. Such systems include a supply tank in which the gas is stored under pressure. They also include at least one pressure reducing and regulating device for delivery of gas at the relatively low pressure required by the various service appliances. For example, the pressure of the fluid in the supply tank may rise as high as 200 p. s. i. and as the tank is subjected to varying external temperatures, the pressure might drop to a minimum of approximately 5 or 10 p. s. i. so that the regulator inlet pressure may vary over a wide range. It may be desirable to connect a single regulator between the tank and the appliances in which case such regulator is required to operate under the aforesaid relatively wide range of inlet pressures. Even if an initial or high pressure regulator is connected between the tank and the delivery regulator, the latter might still be required to operate over a wide pressure range.

Specifications have been set out by various governmental agencies which specify the maximum and minimum delivery pressures over a given range of fluid flow to the appliances.

An important object of this invention is to provide a pressure regulator wherein the fluid pressure in the inlet augments the sealing force on the regulating valve and wherein the various elements of the regulator are automatically positioned without the need of adjusting means.

Other objects are the lessening of the criticality of the shape and accuracy of the machining of the valve seat, and the attainment of a comparatively flat characteristic curve wherein delivery pressure is plotted against flow.

It is also a feature of the invention that the inlet valve construction lends itself to economical mass production techniques.

Other objects and advantages more or less ancillary to the foregoing, and the manner in which all the various objects are realized, will appear in the following description, which, considered in connection with the accompanying drawings, sets forth the preferred embodiment of the invention.

In the drawings:

Fig. 1 is a vertical section through a regulator embodying the invention;

Fig. 2 is a section taken on 2—2 of Fig. 1;

Fig. 3 is a family of characteristic curves showing the performance of the device and, Fig. 4 is an enlarged view of the valve seat.

Referring to Figs. 1 and 2, the regulator is formed of two sheet metal stampings 10 and 11 which are fastened together against a flexible diaphragm 12. Stamping 10 and diaphragm 12 cooperate to form the delivery pressure or control chamber. A post 13 is threaded as at 14 to receive a nut 15 clamping plate 16 and the diaphragm to the post.

The inlet construction includes a sleeve 21, furnace brazed to the lower casing member 10. Sliding within sleeve 21 is an inner sleeve 22, the latter parts cooperating to form an annular groove 23. The parts are retained in assembled position by a nipple 24, threaded in the sleeve 21 there being an O-ring 26 engaging the three inlet parts and serving to prevent escape of gas to the atmosphere. The sleeve 22 is formed with an inlet orifice 27 surrounding which is a valve seat 28. An inlet valve 29 incorporates a disk 31 of rubber-like material for engaging the valve seat 28. The valve is urged toward its closed position by a light spring 32 which engages the valve as well as an opposed shoulder formed in the inlet nipple 33.

In order that the valve may be opened by the regulator, it incorporates a push pin 34 which is operated by a sliding plunger 36 which mounts a pivot pin 37. The latter pin supports a bellcrank member 38 which has a rounded ear 39 riding in the groove 23 and serving as a fixed pivot point. The bellcrank includes another ear 41 which fits into a slot 42 in the sleeve 21. This pivot construction is claimed broadly in my Patent No. 2,616,659 which issued November 4, 1952.

The diaphragm post is apertured as at 43 so as to receive an extension of the bell crank lever. A main regulating spring 44 engages the body section 11 and the diaphragm and serves to oppose pressure in the control chamber. With the construction shown, the effect of inlet pressure is to close the valve 29, whereas the effect of the spring 44 and the lever system is to open the valve against inlet pressure. Pressure in the control chamber moves the lever system against spring 44 so as to permit inlet pressure to close valve 29.

It is believed that the operation and advantages of the invention will be more readily understood if brief reference is made to certain theoretical aspects of regulator design and operation.

Factors tending to cause pressure variation in diaphragm chamber as flow varies

1. DIAPHRAGM CHAMBER PRESSURE RISES AT LOCK-UP

The term "lock-up rise" will be employed to refer to the final increase in control chamber pressure necessary to deform the rubber valve disk sufficiently to seal off the inlet pressure. The lock-up pressure rise in the diaphragm chamber is greater at high inlet pressures than at low pressures because the rubber deformation necessary to seal (after the initial seating) is greater when sealing high pressures than when sealing low pressures. This action is responsible for the pressure rise at low flows and at closure as indicated in the curves of Fig. 3.

2. DELIVERY PRESSURE DROPS AS FLOW INCREASES

As flow increases, the inlet valve must open progressively to accommodate the flow because velocity through the orifice decreases as inlet pressure decreases. Thus, as flow increases, the main regulating spring progressively expands as it opens the valve to accommodate the increased flow. Since the spring progressively assumes a more relaxed position, the balance (delivery) pressures in the diaphragm chamber required to oppose the spring and thus hold the valve at the regulated position will be progressively lower. This effect may be referred to as curve drop due to spring rate.

This drop in the flow-pressure curve is very small at high inlet pressures but increases progressively as inlet pressure decreases, and may be appreciable at low inlet pressures because here the increments of valve opening (and hence of spring expansion) required to produce a given increase in flow are substantial.

3. DELIVERY PRESSURE CHANGES AS INLET PRESSURE CHANGES

Since the pressure in the diaphragm chamber must always (in the type of regulator under consideration) not only compress the regulator spring but open and close the valve to the inlet pressure, it follows that inlet pressure must have an effect upon control chamber (delivery) pressure. The effect of inlet pressure upon the valve and hence upon the pressure required in the diaphragm chamber to hold the valve at its regulated position also changes with flow.

The result of the three phenomena mentioned is to cause a variation in delivery pressure as flow changes and as inlet pressure changes, throughout the operating range of the regulator. This variation will be referred to as "spread." A common means for recording the performance of a regulator is to plot a family of curves, each curve representing a given inlet pressure and being plotted so that flow is the abscissa and delivery pressure the ordinate, such a family of curves for the regulator of this invention appearing in Fig. 3. In such a family of curves, the maximum diaphragm chamber pressure will be the lock-up pressure (occurring at no flow) of the uppermost curve in the family. The minimum delivery pressure will be the delivery pressure at maximum regulated flow of the lowermost curve in the family. If a rectangle is drawn through these points, the setting point of the regulator will be somewhere near the center of the rectangle.

Specifications usually set down the maximum and minimum permissible delivery pressures over a given flow range, so that the spread must be held to specified limits. Furthermore, if it is possible to reduce the spread, a regulator of a given size can be used to provide increased flow. The manner in which the regulator of the invention accomplishes this may be best understood after a brief account of the characteristics of a common type of prior regulator.

Such prior spring-loaded regulators include force-reducing levers and have had the inlet valves arranged to close against inlet pressure, introduced through a small orifice. In such regulators, the family of curves of the type mentioned has its maximum inlet pressure curve as the top curve on the chart. This is because at maximum inlet pressure, the pressure in the diaphragm chamber required to close the valve against inlet pressure is also at maximum. For the same reason the minimum inlet pressure curve of the family is lowermost on the chart. This relative curve placement places the curve having the highest lockout pressure rise in position where such lock-up rise accounts directly for the maximum chamber pressure, which occurs at no flow.

Also, since the minimum inlet curve is the lowest curve on the chart, the aggravated dip of the low pressure curve contributes directly to the minimum delivery pressure, and this occurs at maximum flow.

As has been described, the regulator of this invention is arranged to open the valve against inlet pressure and inlet pressure closes the valve. As mentioned, Fig. 3 shows a family of curves run on a regulator made in accordance with the invention, the critical dimensions being specified on the figure. As can be seen in Fig. 3, the high inlet pressure curve is now the lowermost curve. This occurs because when the valve is spring-opened against inlet pressure, the chamber pressure necessary to let the regulating spring move the valve toward its open position must be smaller when inlet pressure is high than when it is low.

For the same reason the minimum inlet pressure curve is the highest curve of the family.

This reversal of curves has two beneficial effects on the spread or pressure parameters of the family of curves of the regulator of the invention, in that the parameters can be either brought closer together for a given flow or left the same and flow increased. The reasons for this will be apparent from the curve. Since the low inlet pressure curve has the smallest lockout pressure rise, the upper parameter at slow flow is at a minimum. Also, the aggravated dip of the low inlet pressure curve no longer affects the lower parameter up to the flow where the orifice 27 acts as a pure orifice and the valve is fully opened.

Furthermore, since the high inlet pressure curve is lowermost in the family and also is the flattest curve, the effect of dip due to spring rate on the lower parameter is minimized.

Other advantages of the invention

It has been mentioned that in regulators that not only does the flow curve drop due to the relaxation of the regulating spring, but it also drops due to the change in the static effect of inlet pressure against the valve as flow changes. In regulators wherein this static effect tends to open the valve, both the inlet pressure effect and the spring effect must be balanced by chamber pressure. But as flow increases and the valve opens further, the static effect of inlet pressure on opening the valve progressively decreases until a point is reached where further opening has no effect and the inlet acts as a fixed orifice. Thus, in such a regulator the "spring augmenting" effect of inlet pressure progressively decreases as flow increases and this contributes to the drop in the flow curve. This drop-off is most noticeable at low inlet pressures where the valve opening and regulating motion is greatest.

In the valve of the invention, although the curve drop due to spring relaxation is still present, the static effect of differential inlet pressure on the inlet valve is reversed, i. e., inlet pressure instead of augmenting the regulating spring in its valve opening action, opposes the spring and tends to close the valve.

This effect partially offsets the drop due to spring rate until the valve is opened to a point where pure orifice action takes place. Thus, the regulator of the invention tends to hold delivery pressure constant to a greater degree than does the type of regulator that opens against inlet pressure.

Another advantage of the regulator of the invention relates to the valve seat. In regulators closing against inlet pressure the effective area of the inlet pressure on the valve, tending to open the valve from closed or near-closed position, is the throat area (a, Fig. 4) plus the seat area (b, Fig. 4). Thus, for a given orifice and diaphragm motion the lever system must be such that the valve will close against the effective area, and not merely against pressure developed over the throat area. This requires careful machining of the valve seat as to area, and for a given valve seat diameter tends to reduce the effective flow orifice.

In the regulator of the invention, wherein inlet pressure closes the valve, the restoring force of rubber compression occurring over the seat area opposes the valve closure by pressure, so that now, the effective area holding the valve closed is simply the throat area. This has two beneficial effects: (a) for a given diaphragm and lever arrangement, the orifice size can be increased relative to the other type of device. This is particularly beneficial at low inlet pressures where the orifice effect is that which limits the maximum flow attainable in that advantage of the increased orifice area may be taken to extend the regulated flow range, and (b) machining problems are reduced in that the radial extent of the seat at the orifice edge does not enter to as great a degree into the characteristics of the regulator action, and so long as a seal is provided, such radial extent is not so critical.

Another advantage of the regulator of the invention is that it may be made self-closing at a pressure selected to be in excess of the maximum operating pressure, as determined by the spring, diaphragm, and lever arrangement. This serves as an additional protection to the diaphragm as well as insuring that delivery pressure will not be so high as to blow out the appliances served by the regulator when connected into the L. P. G. system.

In addition to the advantages mentioned, the manner in which the reversed inlet valve is constructed in the preferred embodiment of the invention makes possible the provision of such a valve without appreciable increase in manufacturing costs. Furthermore, the inner sleeve 22, which is the sleeve incorporating the valve seat 28, may be made of brass or of other copper bearing metal in accordance with specifications, whereas the other inlet parts may be made of more economical material such as a free-machining mild steel.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A fluid pressure regulator comprising a casing, a diaphragm forming with said casing a pressure chamber, a fluid inlet sleeve mounted in said casing formed with an inwardly extending substantially radial flange at the inner end thereof, an inner sleeve having an inlet port positioned in said inlet sleeve with the end wall thereof spaced from said flange, said flange in cooperation with said inner sleeve defining axially spaced substantially radial walls, said inner sleeve formed with a valve seat surrounding said port and facing away from said chamber, a valve having a rubber-like member for engaging said seat, valve opening means extending from said valve toward said chamber, motion reducing lever means extending between said diaphragm and said valve opening means, said lever means formed with an ear positioned between and axially located by said axially spaced substantially radial walls, and being arranged so that fluid pressure in said chamber tends to withdraw said lever means from said valve opening means permitting inlet pressure to close said valve, and an outlet for said chamber.

2. A fluid pressure regulator comprising a casing, a diaphragm forming with said casing a pressure chamber, a fluid inlet sleeve mounted in said casing formed with an inwardly extending substantially radial flange at the inner end thereof, an inner sleeve having an inlet port positioned in said inlet sleeve with the end wall thereof spaced from said flange, said flange in cooperation with said inner sleeve defining axially spaced substantially radial walls, said inner sleeve formed with a valve seat surrounding said port and facing away from said chamber, a valve having a rubber-like member for engaging said seat, valve opening means extending through said port, motion reducing lever means extending between said diaphragm and said valve opening means, said lever means formed with an ear positioned between and axially located by said axially spaced substantially radial walls and being arranged so that fluid pressure in said chamber tends to withdraw said lever means from said valve opening means permitting inlet pressure to close said valve, and an outlet for said chamber.

3. A fluid pressure regulator comprising a casing, a diaphragm forming with said casing a pressure chamber, an inlet sleeve member fixed in said casing formed with an inwardly extending substantially radial flange, an inner sleeve having an inlet port positioned in said inlet sleeve with the end wall thereof spaced from said flange, said flange in cooperation with said inner sleeve defining axially spaced substantially radial walls, said inner sleeve formed with a valve seat surrounding said port, an axially outwardly facing shoulder, a member threaded into said inlet sleeve having an end portion facing said shoulder, sealing means engaging said end portion, shoulder and adjacent wall of said inlet sleeve, a valve having a rubber-like member engaging said seat, valve opening means extending through said port, motion reducing lever means extending between said diaphragm and said valve opening means formed with an ear axially located by said axially spaced substantially radial walls, said lever means being arranged so that fluid pressure in said chamber tends to withdraw said lever means from said valve opening means permitting inlet pressure to close said valve, and a fluid outlet in said chamber.

4. A fluid pressure regulator comprising a casing, a diaphragm forming with said casing a pressure chamber, a fluid inlet sleeve mounted in said casing formed with an inwardly extending substantially radial flange at the inner end thereof, an inner sleeve having an inlet port positioned in said inlet sleeve with the end wall thereof spaced from said flange, said flange in cooperation with said inner sleeve defining axially spaced substantially radial walls, said inner sleeve formed with a valve seat surrounding said port and facing away from said chamber, a valve having a rubberlike member for engaging said seat, valve opening means extending from said valve toward said chamber, motion reducing lever means extending between said diaphragm and said valve opening means, said lever means formed with an ear positioned between and axially located by said axially spaced substantially radial walls and being arranged so that fluid pressure in said chamber tends to withdraw said lever means from said valve opening means permitting inlet pressure to close said valve, and an outlet for said chamber, said inner sleeve, valve, valve opening means and lever means being proportioned for removal from said regulator by axial motion outwardly through said inlet sleeve.

THEODORE A. ST. CLAIR.

References Cited in the file of this patent

UNITED STATES PATENTS

| Number | Name | Date |
|---|---|---|
| 324,905 | Westinghouse | Aug. 25, 1885 |
| 986,344 | Baehr | Mar. 7, 1911 |
| 1,819,288 | Groble | Aug. 18, 1931 |
| 2,263,611 | Carnes | Nov. 25, 1941 |
| 2,517,745 | Weatherhead | Aug. 6, 1950 |